US012545329B2

(12) United States Patent
Orchard et al.

(10) Patent No.: US 12,545,329 B2
(45) Date of Patent: Feb. 10, 2026

(54) INTEGRAL SUBFRAME TO DIRECT IMPACT LOADPATH

(71) Applicant: RIVIAN IP HOLDINGS, LLC, Irvine, CA (US)

(72) Inventors: Allen Orchard, Shepperton (GB); Nomaan Khan, Farmington Hills, MI (US); Jiacheng Huang, Troy, MI (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 231 days.

(21) Appl. No.: 17/867,344

(22) Filed: Jul. 18, 2022

(65) Prior Publication Data

US 2023/0070543 A1 Mar. 9, 2023

Related U.S. Application Data

(60) Provisional application No. 63/240,527, filed on Sep. 3, 2021.

(51) Int. Cl.
*B62D 21/15* (2006.01)
*B62D 21/03* (2006.01)
*B62D 21/11* (2006.01)

(52) U.S. Cl.
CPC .......... *B62D 21/155* (2013.01); *B62D 21/03* (2013.01); *B62D 21/11* (2013.01)

(58) Field of Classification Search
CPC .... B62D 21/15; B62D 21/152; B62D 21/155; B62D 21/11; B62D 21/03
See application file for complete search history.

(56) References Cited

U.S. PATENT DOCUMENTS

| | | | | |
|---|---|---|---|---|
| 10,518,620 B2 * | 12/2019 | Yamafuji | ................. | B60K 1/04 |
| 2004/0262904 A1 * | 12/2004 | Horita | .................... | B62D 21/15 |
| | | | | 280/779 |
| 2006/0113784 A1 * | 6/2006 | Kishima | ............. | B62D 21/155 |
| | | | | 296/203.02 |
| 2006/0181071 A1 * | 8/2006 | Mitsui | .................... | B62D 25/08 |
| | | | | 280/784 |
| 2009/0001767 A1 * | 1/2009 | Yamaguchi | .......... | B60K 15/063 |
| | | | | 296/203.04 |

(Continued)

FOREIGN PATENT DOCUMENTS

| | | |
|---|---|---|
| DE | 4134267 A1 | 4/1992 |
| DE | 60307774 T2 | 9/2007 |

(Continued)

OTHER PUBLICATIONS

YouTube Video, "Tesla Model 3 is the safest vehicle in the world", retrieved from URL: https://www.youtube.com/watch?v=fJosrhya3XI, Jun. 12, 2022, (12 pages).

(Continued)

*Primary Examiner* — Minnah L Seoh
(74) *Attorney, Agent, or Firm* — HG Law LLP

(57) ABSTRACT

A subframe mount of a front subframe comprising a vehicle frame. The subframe mount comprises a main body configured to receive a securing feature of a frame body of the vehicle frame. The subframe mount also comprises an open-ended slot configured to enable translation of the securing feature independent of the subframe mount in response to an impact event.

19 Claims, 8 Drawing Sheets

(56) References Cited

U.S. PATENT DOCUMENTS

2011/0316295 A1* 12/2011 Yamada ................ B62D 21/11
293/132
2018/0118273 A1* 5/2018 Mcconnell ............ B62D 21/11

FOREIGN PATENT DOCUMENTS

| DE | 102006002750 A1 | 9/2007 |
| DE | 60319874 T2 | 4/2009 |
| DE | 102011104460 B4 | 7/2016 |

OTHER PUBLICATIONS

YouTube Video, "Volvo XC90-Volvo Cars' steel story", retrieved from https://www.youtube.com/watch?v=fDPH8Q-uKLo, Dec. 5, 2014, (7 pages).

* cited by examiner

INTEGRAL SUBFRAME TO DIRECT IMPACT LOADPATH

CROSS-REFERENCE TO RELATED APPLICATIONS

This application claims the benefit of U.S. Provisional Patent Application No. 63/240,527 filed Sep. 3, 2021, the disclosure of which is hereby incorporated by reference herein in its entirety.

INTRODUCTION

The present disclosure is directed to a vehicle frame with subframe components comprising impact mitigation features, and, more particularly a vehicle frame comprising a subframe structured to mitigate, absorb, or deflect the force of certain impacts ("impact mitigation") caused by an impact along forward facing features of the vehicle frame and subframe features affixed to the vehicle frame.

SUMMARY

Vehicles comprise a plurality of different powertrain, body, and frame assemblies. Certain vehicles assemblies (e.g., electronic vehicle assemblies) comprise a subframe arranged below a frame body. Suspension and powertrain components may be mounted to either portions of the subframe or portions of the frame body. The frame may be configured to absorb a majority of the energy from an impact such that neither the powertrain components or the suspension components are deformed from the impact and the passenger compartment in the body does not receive a majority of the impact energy. A front subframe that receives front impact energy and directs the load path towards mounts configured to mechanically fail and release a frame body would prove useful in managing front impact energy. The present disclosure is directed to systems and methods for creating an integral front subframe that absorbs front impact energy, and more particularly, to systems and methods that absorb and redirect front impact energy by enabling mounts in the frame to mechanically fail release components secured to the subframe by the mounts.

Described herein are systems and methods for a front vehicle subframe that lowers the front impact force path of an impact to a vehicle front by using an impact can structure to absorb and redirect at least a portion of the impact energy towards open-ended slotted body mounts that release components when a threshold impact force is translated through the impact cans of the front subframe to the open-ended slotted body mounts. The subframe is advantageous in that the various components of the subframe are configured to direct a load received from a front impact such that a frame body can deform independent of the subframe in order to prevent the transmission of a majority of the energy from the impact to powertrain components, suspension components, or a passenger area. The subframe additionally comprises releasable and/or deformable mounts that are structured to release the frame body to enable the independent deformation of the frame body and the subframe. This is advantageous as it enables the subframe to be structure to absorb a majority of the energy through deformation while the frame body and other components are not subject to significant deformation from a front impact.

In some embodiments, the subframe mount (e.g., the body mount, frame mount, subframe mount, and/or rear mount) may be manufactured by first extruding a rigid material into a quadrilateral rail. Once the quadrilateral rail is formed, an open-ended slot is machined (e.g., cut) into a top portion of the quadrilateral rail, wherein the slot is structure to accommodate a securing feature of a frame body. Additionally, at least one deformation-initiating feature is machined (e.g., cast, formed, or cut) in a portion of the quadrilateral rail below the top portion, wherein the deformation-initiating feature reduces the stiffness of the quadrilateral rail such that the quadrilateral rail deforms when exposed to an impact force exceeding a threshold impact force. The threshold impact force may be less than a maximum impact force corresponding to an anticipated impact event representing a front impact.

In some embodiments, the front vehicle subframe is manufactured by a process that may comprise providing at least two rigid frame rails comprising material of a thickness able to withstand a maximum impact force corresponding to an anticipated impact event representing a front impact. The at least two rigid frame rails may be arranged into a quadrilateral shape (e.g., see the rigid cross member of FIG. 1 and the rigid subframe rail of FIG. 2). Each end of at least two rigid frame rails may be secured to other ends of each of the at least two rigid frame rails by welds configured to mechanically fail when subjected to a threshold impact force less than the maximum impact force. Additionally, at least one impact can structure and at least one body mount are provided, wherein the at least one body mount is configured to release a frame body securing feature when subjected to the threshold impact force. The at least one impact can structure and the at least one body mount are arranged around the quadrilateral shape (e.g., see FIG. 1). The at least one impact can structure and the at least one body mount are secured to edges of the quadrilateral shape at least one of a fastener, a weld, or an adhesive.

In some embodiments, the disclosure is directed to a subframe mount, comprising a main body configured to receive a securing feature of a frame body, and an open-ended slot configured to enable translation of the securing feature independent of the subframe mount in response to an impact event. The open-ended slot is arranged such that the opening faces a front portion of the subframe. In some embodiments, the open-ended slot is arranged such that the opening faces a bottom portion of the frame body.

In some embodiments, the main body further comprises at least one deformation-initiating feature. The at least one deformation-initiating feature is structured to mechanically deform and/or fail when subjected to an impact force exceeding a threshold impact force.

In some embodiments, the securing feature of the frame body comprises a tab configured to accommodate a fastener.

In some embodiments, the subframe mount abuts at least one rigid subframe rail.

In some embodiments, the disclosure is directed to a method of manufacturing a vehicle frame. A rigid material is extruded into a quadrilateral rail. An open-ended slot in a top portion of the quadrilateral rail is machined, wherein the slot is structure to accommodate a securing feature of a frame body. At least one deformation-initiating feature is machined in a portion of the quadrilateral rail below the top portion, wherein the deformation-initiating feature reduces the stiffness of the quadrilateral rail such that the quadrilateral rail deforms when exposed to an impact force exceeding a threshold impact force.

In some embodiments, the disclosure is directed to a method of manufacturing a vehicle frame. The method comprises providing at least two rigid frame rails comprising material of a thickness able to withstand a maximum impact force. At least two rigid frame rails are arranged in a quadrilateral shape. Each end of the at least two rigid frame rails are secured to other ends of each of the at least two rigid frame rails by welds configured to mechanically fail when subjected to a threshold impact force less than the maximum impact force. At least one impact can structure and at least one body mount are provided, wherein the at least one body mount is configured to release a frame body securing feature when subjected to the threshold impact force. The at least one impact can structure and the at least one body mount are arranged around the quadrilateral shape. The at least one impact can structure and the at least one body mount are secured to edges of the quadrilateral shape by at least one of a fastener, a weld, or an adhesive.

In some embodiments, the disclosure is directed to a front vehicle subframe. The front vehicle subframe comprises a frame mount configured to accommodate a releasable securing feature, and at least one reinforcement structure arranged rearward of the frame mount. In some embodiments, the frame mount comprises an open-ended slot configured to accommodate the releasable securing feature. In some embodiments, the releasable securing feature corresponds to a frame body mount for a frame body of a vehicle.

In some embodiments, the front vehicle subframe comprises an impact can structure, wherein a front portion of the impact can structure is positioned above a rear portion of the impact can structure, and wherein the rear portion abuts at least one rigid subframe rail. In some embodiments, at least one reinforcement structure abuts the frame mount.

In some embodiments, the front vehicle subframe comprises a second frame mount, wherein the second frame mount is configured to mechanically deform when subjected to an impact force exceeding a threshold impact force. The second frame mount is configured to release a securing structure corresponding to a second portion of a frame body, different from a first portion secured at the frame mount, when mechanically deforming.

In some embodiments, the front vehicle subframe is configured to mechanically deform down and away from at least a portion of a frame body fixedly attached to the body mount with the releasable securing feature when subjected to a front impact force. In some embodiments, the front vehicle subframe comprises three and only three pairs of frame mounts. A first mount of the three frame mounts is positioned towards a front portion of the front vehicle subframe and comprises at least one deformation initiation rib and a first securing feature of a frame body. A second mount of the three frame mounts is positioned towards a middle portion of the front vehicle subframe and comprises an open-ended slot configured to release a second securing feature of the frame body. A third mount of the three frame mounts is positioned towards a rear portion of the front vehicle subframe and comprises a deformation initiation portion forward of a third securing feature of the frame body.

In some embodiments, the disclosure is directed to a vehicle. The vehicle comprises a vehicle frame and a powertrain assembly. The vehicle frame comprises a front vehicle subframe, at least one suspension mount, and at least one body mount. The front vehicle subframe comprises a frame mount configured to accommodate a releasable securing feature, and at least one reinforcement structure arranged rearward of the frame mount. In some embodiments, the front vehicle subframe is configured to be secured to a pair of frame rails. Additionally, the pair of frame rails comprise at least one releasable securing features, wherein the pair of frame rails abut at least one rigid crossmember configured to withstand a maximum impact force. A rear vehicle subframe is secured to a rear portion of the frame rails.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for a vehicle frame with subframe components comprising impact mitigation features, and, more particularly a vehicle frame comprising a subframe structured to mitigate, absorb, or deflect the force of certain impacts ("impact mitigation") caused by an impact along forward facing features of the vehicle frame and subframe features affixed to the vehicle frame.

Figure 1:
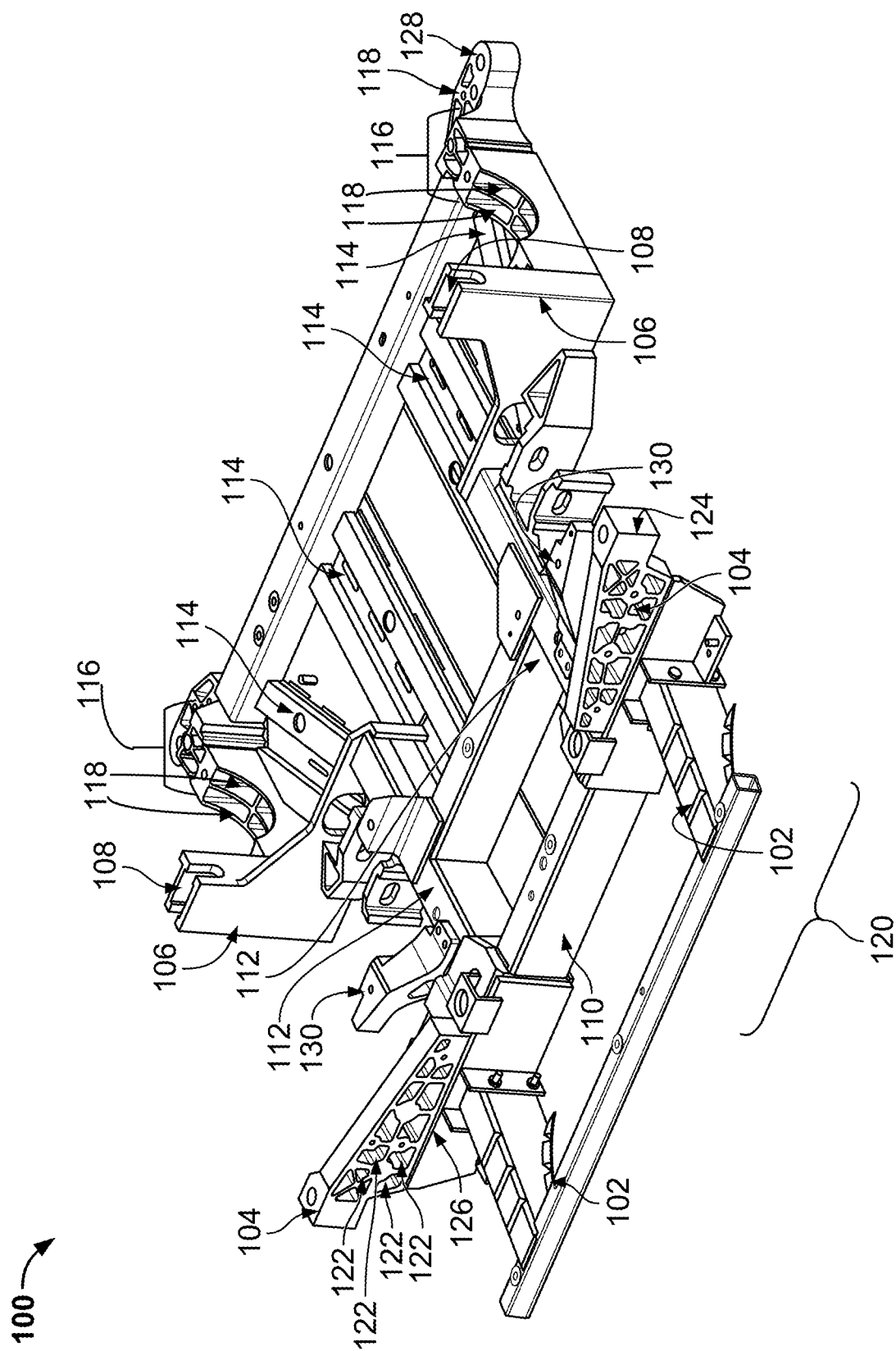
FIG. 1 depicts an example front vehicle subframe, in accordance with some embodiments of the disclosure.

FIG. 1 depicts front vehicle subframe 100, in accordance with some embodiments of the disclosure. Front vehicle subframe 100 may incorporate or be incorporated into any or all of the assemblies and features of FIGS. 2-7. Front vehicle subframe 100 may also be manufactured by the method of FIG. 8. Any or all of the features depicted in or described in reference to FIGS. 2-8 may be incorporated, in whole or in part, into front vehicle subframe 100.

Figure 2:
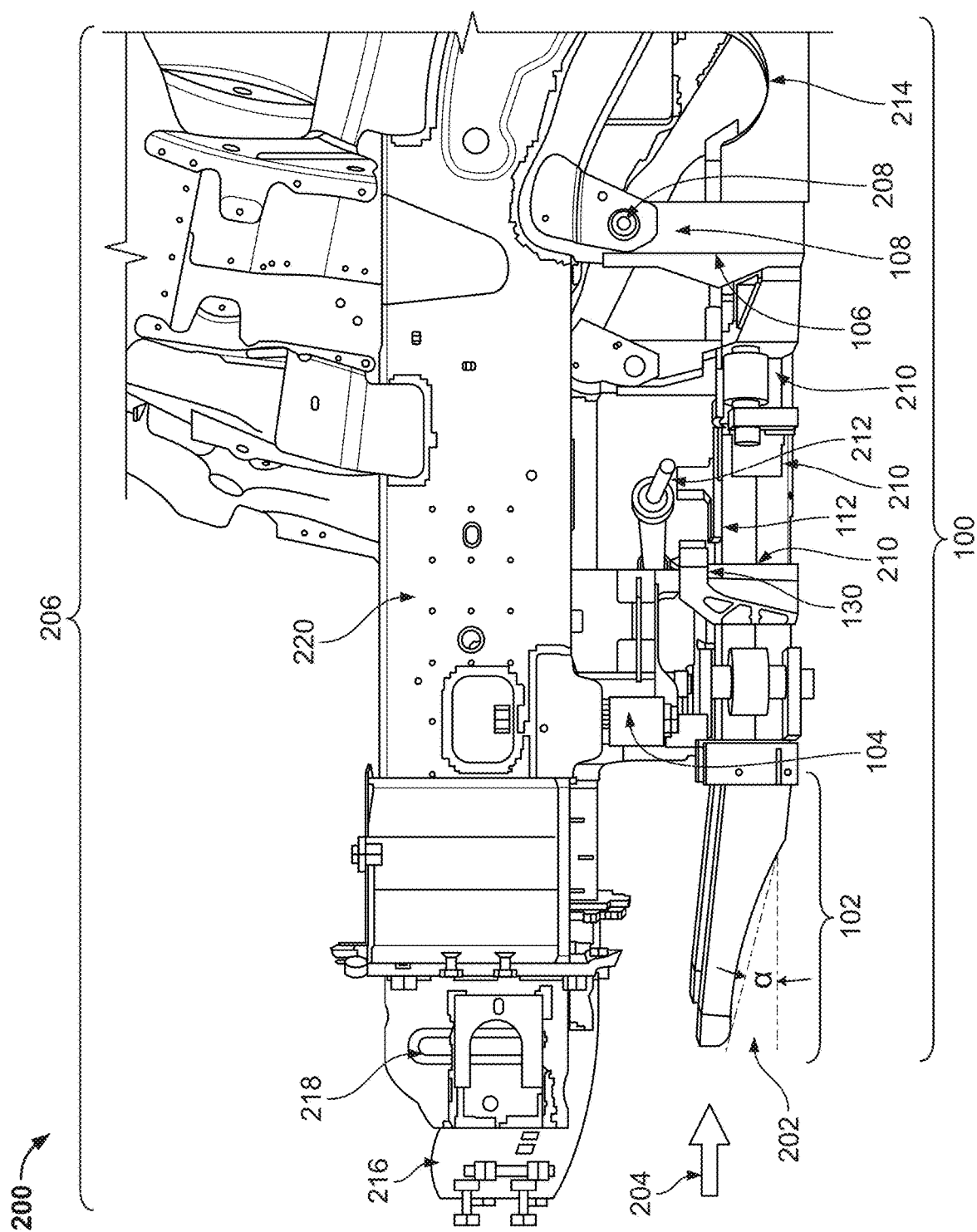
FIG. 2 depicts a side view of a front vehicle frame prior to deforming in response to a front impact force, in accordance with some embodiments of the disclosure.

Front vehicle subframe 100 comprises impact can structures 102, body mounts 104, subframe mounts 106 (each comprising open-ended slot 108), rigid cross members 110 connecting rigid subframe rails 112, reinforcements 114 (each positioned behind subframe mounts 106), and rear mounts 116 that each are comprised of deformation-initiating features 118. Impact can structures 102 are configured to receive an impact along a forwardmost feature of front vehicle subframe 100. The impact may be off center when received by the forwardmost feature of front vehicle subframe 100 (e.g., as shown by impact area 120 of FIG. 1). Impact can structures 102 may be arranged at a height corresponding to a target impact point (e.g., located within impact area 120) and are structured to mechanically deform downwards towards the ground to direct the trajectory of the impact energy and absorb a portion of the energy from the impact. In some embodiments, impact can structures 102 may be angled such that from a side view, a frontward portion of impact can structures 102 are vertically higher than a rearward portion of the impact can structures (e.g., as shown in FIG. 2 via angle 202 annotated by α). The angle of the crash can structures, for example the angle of the crash can structures 102 relative to the other portions of subframe 100 and/or the angle from the frontward portion to the reward portion of a crash can structure (e.g., angle 202 of FIG. 2 annotated by α) enables a lower load path for the impact energy to translate throughout front vehicle subframe 100 in comparison to the load path that would result if the pair of impact can structures 102 were level (e.g., if angle 202 of FIG. 2 annotated by α was substantially similar or equal to a value of zero). In some embodiments, the lower load path facilitated by the crash can structures 102 enables the remaining features of front vehicle subframe 100 to deform independent of the rest of the vehicle components (e.g., other components shown in FIG. 7 besides front vehicle subframe 100) when receiving a load or energy from an impact received at impact area 120. In some embodiments, when receiving a load or energy from an impact received at impact area 120, vehicle components (e.g., vehicle body 702 and frame body 704 of FIG. 7) are configured to release from the front vehicle subframe 100

Positioned rearward of impact can structures 102 are body mounts 104 which are configured to fixedly attach a frame body (e.g., frame body 704 of FIG. 7) to front vehicle subframe 100 at body mounts 104 and further configured to mechanically deform and release the frame body upon receiving an impact at impact area 120. The frame body may be secured to body mounts 104 by fasteners and may further comprise at least one of dampers or bushings secured to at least one of front vehicle subframe 100 or a vehicle body, thereby reducing noise during operation of a vehicle comprising these components (e.g., vehicle 700 of FIG. 7). Body mounts 104 may be structured to withstand a threshold impact force (e.g., a load defined by an impact to impact area 120) and may deform when experiencing an impact force above the threshold. In some embodiments, recesses 122 of body mount 104 are configured to fracture and release a frame body (e.g., frame body 704 of FIG. 7) to which front vehicle subframe 100 is mounted. In some embodiments, end 124 of body mounts 104, which are fixedly attached to a frame body, are configured to deform, and release the frame body. In some embodiments, weld 126 between body mount 104 and cross member 110 may fracture and release body mount 104 along with the frame body. When body mounts 104 deform, the frame body is configured to be released and not deform along the same trajectory as front vehicle subframe 100, which is configured to deform towards the ground and away from the frame body.

In some embodiments, subframe mounts 106 are positioned rearward of body mounts 104. Subframe mounts 106 may be configured to receive features of a frame body (e.g., frame body 704 of FIG. 7) to secure front vehicle subframe 100 to the frame body. Additionally, subframe mounts 106 are configured to release the received features when an impact to impact area 120 meets or exceeds a threshold impact force. At least one of reinforcements 114 is arranged to abut each of subframe mounts 106 and increase stiffness along the front to back axis of subframe mounts 106 such that subframe mounts 106 do not deform when subjected force that meets or exceeds the threshold impact force. At least one of reinforcements 114 may be aligned towards a centerline of front vehicle subframe 100 and may have additional struts (not shown in FIG. 1) that flair out towards the sides of front vehicle subframe 100 to provide support in the event of a head on or off-center impact (e.g., as represented by impact area 120). Each of subframe mounts 106 comprises at least one of open-ended slots 108. Each of open-ended slots 108 is positioned towards an apex of a respective subframe mount 106 to receive a securing feature of at least one of a vehicle body or frame body (e.g., vehicle body 702 or frame body 704 of FIG. 7). When front vehicle subframe 100 is subjected to a front impact (e.g., within impact area 120), the securing features are released from open-ended slots 108 such that the assembly corresponding to the securing features first moves upwards and then rearwards. The assembly is then configured to translate down and away from a passenger area that is positioned above and rearward of the subframe (e.g., towards a front half of vehicle body 702 of FIG. 7). The release of the securing features, as enabled by open-ended slots 108 of subframe mounts 106, causes the components (e.g., components of frame body 704 and vehicle body 702 of FIG. 7) to move independent of front vehicle subframe 100 as front vehicle subframe 100 progressively deforms down towards a surface of the ground in response to a front impact to impact area 120.

Rear mounts 116 are arranged rearward of subframe mounts 106 and abut the subframe mount 106s. Each of rear mounts 116 comprise at least one of deformation-initiating features 118. Deformation-initiating features 118 enable energy or impact forces received from a front impact to impact area 120 to be dispersed by the deformation of rear mounts 116. Deformation-initiating features 118 are configured to reduce or substantially prevent the impact energy or impact load from being absorbed by subframe mounts 106, thereby preventing unintended deformation of subframe mounts 106 that could otherwise prevent release of a vehicle body or frame body for translation independent of front vehicle subframe 100. In some embodiments, deformation-initiating features 118 may deform in a manner that also causes fastener accommodating feature 128 (e.g., an opening or threaded hole) of rear mount 116 to mechanically deform and release a frame body secured to rear mount 116.

Any of body mounts 104, subframe mounts 106, and rear mounts 116 of FIG. 1 may secure a frame body or a vehicle body to front vehicle subframe 100. Each of these mounts are configured to secure a portion of a frame body through the use of securing features (e.g., adhesive, welds, fasteners, and combinations thereof). Arranged between body mounts 104 and subframe mounts 106 are steering mounts 130. Steering mounts 130 are structured to accommodate a steering assembly (not depicted) to enable a vehicle (e.g., vehicle 700 of FIG. 7) to steer. In some embodiments, steering mounts 130 may be structured to mechanically withstand an impact force that meets or exceeds a threshold impact force to impact area 120 such that steering mounts 130 do not mechanically deform.

FIG. 2 depicts side view 200 of frame body 206 affixed to front vehicle subframe 100 of FIG. 1 prior to deforming in response to threshold impact force 204, in accordance with some embodiments of the disclosure. Side view 200 may incorporate or be incorporated into any or all of the assemblies and features of FIGS. 1 and 3-7. The components depicted via side view 200 may also be manufactured by the method of FIG. 8. Any or all of the features depicted in or described in reference to FIGS. 1 and 3-8 may be incorporated, in whole or in part, into side view 200.

Front vehicle subframe 100 corresponds to the subframe of FIG. 1, with impact can structure 102, body mount 104, steering mount 130, and subframe mount 106 comprising open-ended slot 108 populated by frame body releasable feature 208. A rigid portion of front vehicle subframe 100 comprising rigid subframe rails 112 assembled using welds 210 between interfacing components is positioned between body mount 104 and subframe mount 106 is. Welds 210 may be structured to mechanically deform (e.g., at least one of structural breaking, elastic deformation, plastic deformation, and the like) when threshold impact force 204 is received by impact area 120 of FIG. 1. In some embodiments, front vehicle subframe 100 further comprises rigid frame rail 212 arranged in a quadrilateral shape (e.g., corresponding to the quadrilateral shape shown in FIG. 1 formed via rigid cross members 110 connecting to rigid subframe rails 112). Welds 210 may be structured to mechanically deform such that the components connected via welds 210 are released for independent translation before rigid subframe rails 112 deform. Rigid subframe rails 112 as shown in FIG. 2 are structured to accommodate suspension and steering components 212 such that there is no mechanical interference between these components during operation and after receiving threshold impact force 204 at impact area 120 of FIG. 1. Positioned rearward of subframe mount 106 is deformation-initiating feature 214 (e.g., corresponding to at least one of deformation-initiating features 118 of FIG. 1), which is positioned forward of a rear mount for securing a portion of frame body 206 rearward of the depicted portion of front vehicle subframe 100. As shown in FIG. 2, deformation-initiating feature 214 comprises a semi-circle cutout structured to reduce the resistance of a rear mount comprised of deformation-initiating feature 214 such that the rear mount is caused to deform in response to a compressive force received via threshold impact force 204. In some embodiments, deformation-initiating feature 214 comprises a cutout corresponding to a geometry enabling strategic deformation of a rear mount comprising deformation-initiating feature 118 such that the rear mount mechanically deforms prior to subframe mount 106.

Subframe impact can structures 102 as shown in FIG. 2 may correspond to the subframe impact can structures of FIG. 1 and are depicted as being positioned at angle 202 (as annotated by α) in order to enable a lower load path for impact energy to translate throughout front vehicle subframe 100 relative to a load path corresponding to angle 202 being substantially similar to or equal to zero (e.g., where subframe impact can structures 102 are substantially level). Arranged above subframe impact can structures 102 is bumper 216 affixed to a front surface of frame body impact can structure 218. Frame body impact can structure 218 is configured to mechanically deform and absorb energy so as to limit impact forces or energy transmitted to frame rail 220 (e.g., corresponding to frame body 704 of FIG. 7).

Figure 3:
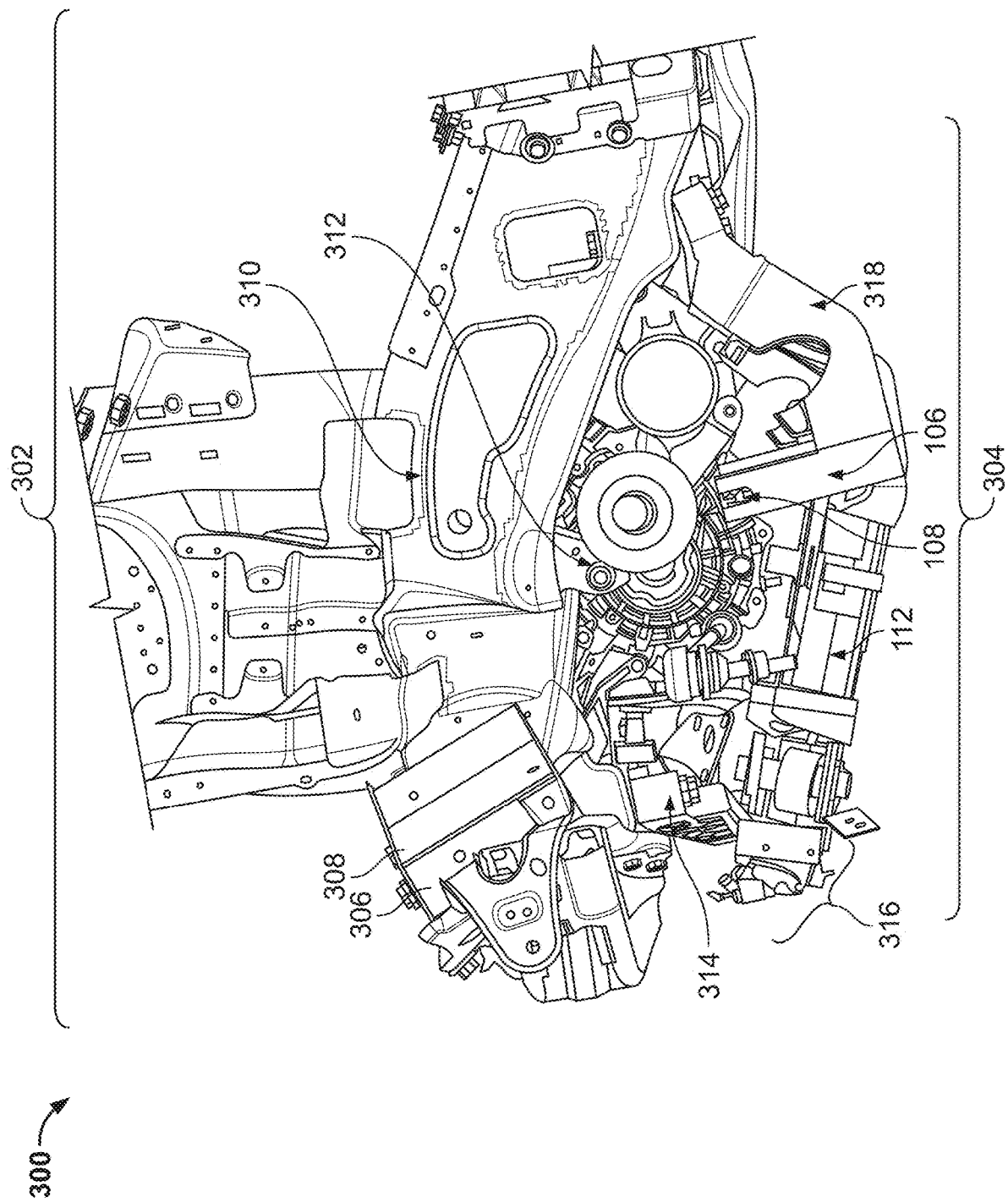
FIG. 3 depicts a side of a front vehicle frame after deforming in response to a front impact force, in accordance with some embodiments of the disclosure.

FIG. 3 depicts deformed side view 300 of an example of a deformed frame body 302 and deformed front vehicle subframe 304 after receiving a front impact force (e.g., threshold impact force 204 of FIG. 2), in accordance with some embodiments of the disclosure. Deformed frame body 302 and deformed front vehicle subframe 304 may incorporate or be incorporated into any or all of the assemblies and features of FIGS. 1, 2, and 4-7. For example, deformed frame body 302 comprises components of FIGS. 1 and 2 that are deformed (e.g., frame rail 220 corresponds to deformed frame rail 310). Deformed frame body 302 and deformed front vehicle subframe 304 may also be manufactured by the method of FIG. 8. Any or all of the features depicted in or described in reference to FIGS. 1, 2, and 4-8 may be incorporated, in whole or in part, into deformed frame body 302 and deformed front vehicle subframe 304.

Figure 7:
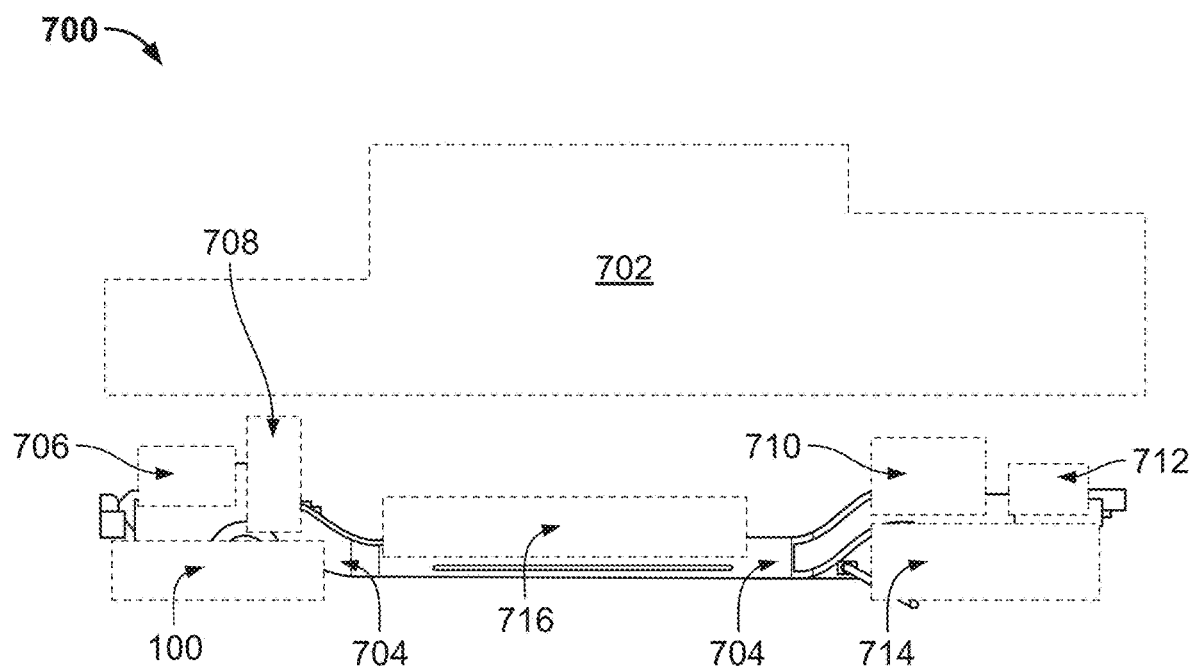
FIG. 7 depicts a side view of a vehicle comprising a vehicle body and a vehicle frame, in accordance with some embodiments of the disclosure.

Deformed side view 300 depicts a side view of an example of a deformed frame body 302, which corresponds to a deformed version of frame body 704 of FIG. 7, and deformed front vehicle subframe 304, corresponding to a deformed version of front vehicle subframe 100 of FIGS. 1 and 2, after being subjected to a force that meets or exceeds threshold impact force 204 of FIG. 2. Deformed frame body 302 comprises deformed frame body impact can 306, deformed bumper 308, and deformed frame rail 310. Deformed frame body 302 is shown as being released from subframe mount 106 as released frame body releasable feature 312 (corresponding to frame body releasable feature 208 of FIG. 2) is not connected to subframe mount 106 as release frame body releasable feature 312 is no longer populating open-ended slot 108. Deformed frame body 302 also comprises released body mount 314 (corresponding to body mount 104 of FIGS. 1 and 2) as a result of a mechanically failed body mount weld (e.g., one of welds 210 of FIG. 2). In some embodiments, released body mount 314 may also become released by fractures, caused by a front impact, about ribs (e.g., ribs formed by recessed 122 of FIG. 1) comprising the main body of the body mount or may be released by fractures, caused by a front impact, about a securing feature towards an outward facing end of the body mount (e.g., around end 124 of FIG. 1).

Positioned below deformed frame body 302 is an example of a deformed front vehicle subframe 304. Arranged towards the front of deformed front vehicle subframe 304 is deformed subframe impact can structure 316. Deformed subframe impact can structure 316 deformed in response to receiving threshold impact force 204 of FIG. 2 in an area corresponding to impact area 120 of FIG. 1. As shown in FIG. 3, the deformation of deformed subframe impact can structure 316 and deformed frame body 302 are not along the same trajectories. Positioned rearward of deformed subframe impact can structure 316 is rigid subframe rail 112 of FIGS. 1 and 2, which is configured to not substantially mechanically deform in response to the front impact. Deformed deformation initiation feature 318 is arranged behind or rearward subframe mount 106 and rigid subframe rail 112. As shown, deformed deformation initiation feature 318 (corresponding to a deformed version of deformation initiation feature 214 of FIG. 2) mechanically deforms whereas subframe mount 106 and rigid subframe rail 112 retain geometries substantially similar or the same as their pre-impact configurations.

Figure 4A:
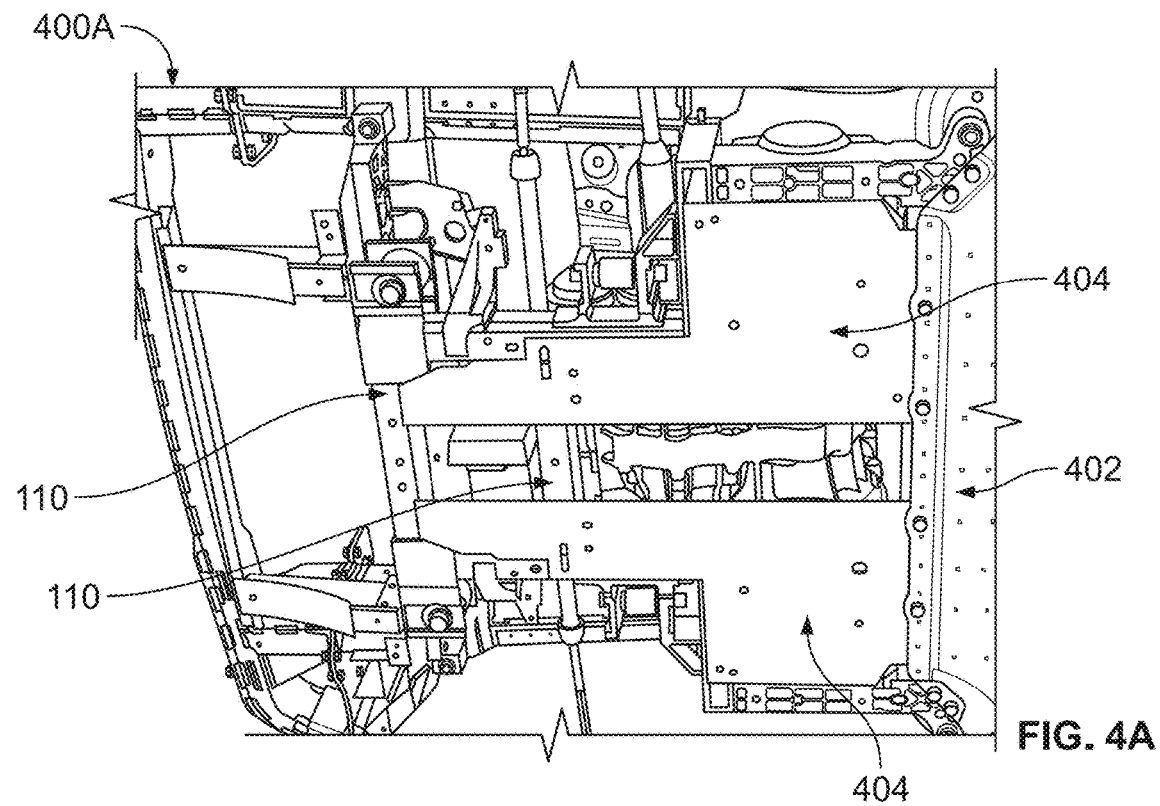
FIGS. 4A and 4B depict a pair of bottom views of a front vehicle frame, in accordance with some embodiments of the disclosure.
Figure 4B:
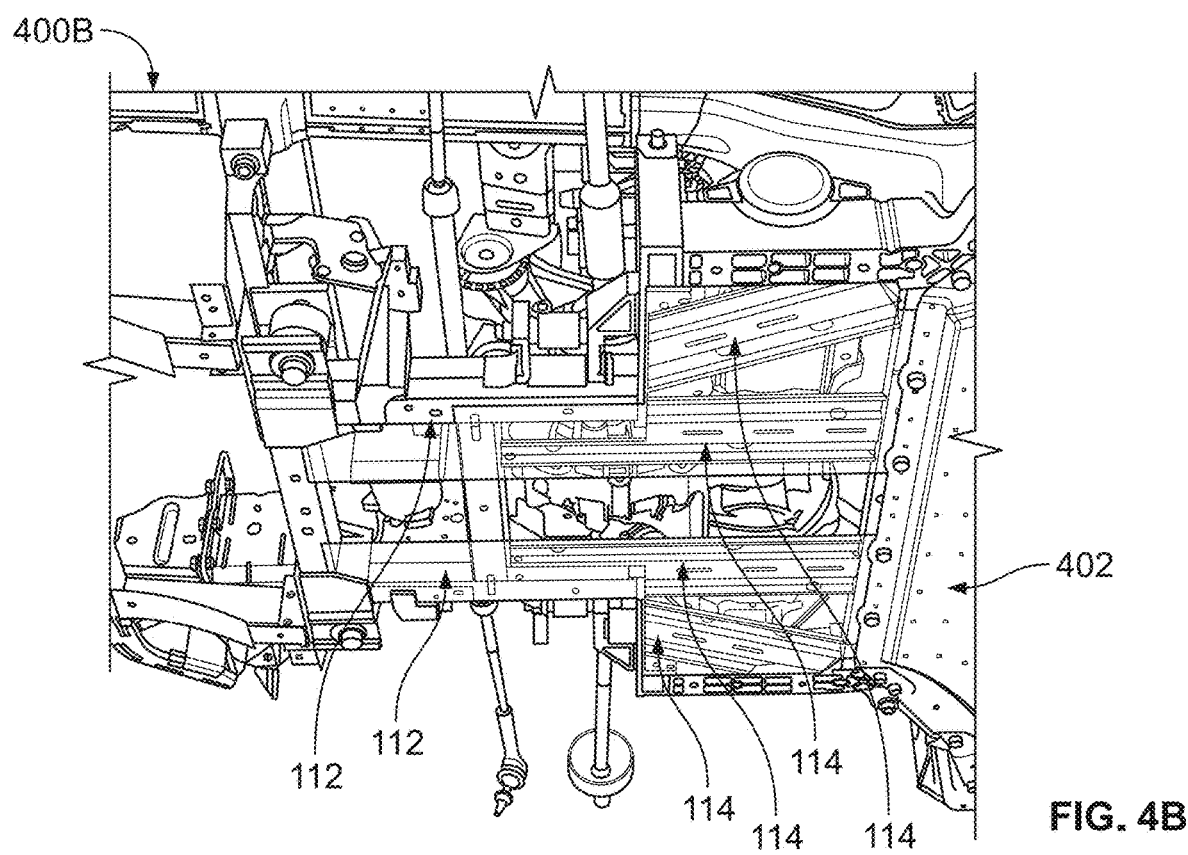

FIG. 4A depicts bottom view 400A of front vehicle subframe 100 of FIG. 1 with reaction surface 402, shear plates 404, and crossmembers 110 of FIG. 1. FIG. 4B depicts bottom view 400B of front vehicle subframe 100 of FIG. 1 comprising reinforcements 114, reaction surface 402, and rigid subframe rails 112 of FIG. 1, in accordance with some embodiments of the disclosure. The components and features depicted in bottom views 400A and 400B may incorporate or be incorporated into any or all of the assemblies and features of FIGS. 1-3 and 5-7. The components and features depicted in bottom views 400A and 400B may also be manufactured by the method of FIG. 8. Any or all of the features depicted in or described in reference to FIGS. 1-3 and 5-8 may be incorporated, in whole or in part, into the assemblies, components, and features depicted in bottom views 400A and 400B.

Bottom view 400A image corresponds to a front vehicle subframe with a first portion of shear plates 404 secured to the bottom surface of a plurality of reinforcements (e.g., reinforcements 114 of FIG. 1) and a second portion of shear plates 404 secured to rigid subframe rails (e.g., rigid subframe rails 112 of FIG. 1). In some embodiments, shear plates 404 are welded at securing points where each of the shear plates contacts the at least one reinforcement or at least one of the rigid subframe rails. In some embodiments, fasteners and/or adhesives may be utilized to maintain the position of the shear plates. Shear plates 404 are structured to add additional stiffness to portions of the subframe intended to avoid deformation when the subframe is subjected to a front impact (e.g., threshold impact force 204 of FIG. 2).

Bottom view 400B corresponds to a front vehicle subframe without shear plates, showing reinforcements 114 and rigid subframe rails 112. Positioned rear of reinforcements 114 is reaction surface 402, which is fixedly attached to a rear portion of the subframe near a rear end of reinforcements 114. Reaction surface 402 is structured to provide additional stiffness to a portion of a vehicle comprising the front vehicle subframe depicted in bottom view 400B. Reaction surface 402 is arranged behind the subframe such that the deformation of the subframe and a frame body secured to the subframe does not impact or affect the components in the portion of the vehicle arranged above reaction surface 402 (e.g., vehicle body 702 of FIG. 7).

Figure 5:
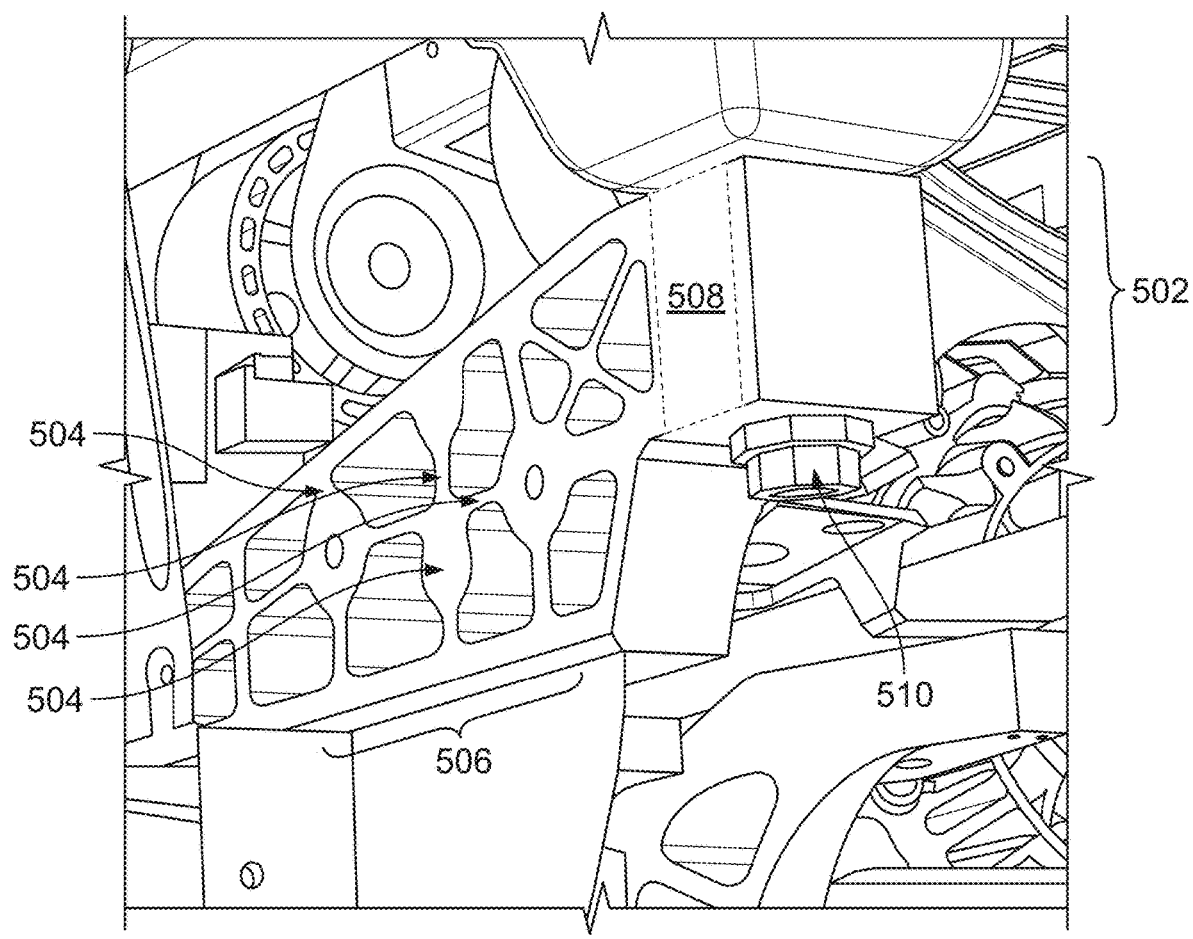
FIG. 5 depicts an exemplary securing feature, in accordance with some embodiments of the disclosure.

FIG. 5 depicts securing feature 502 (corresponding to at least one of body mount 104, subframe mount 106, and rear mount 116 of FIG. 1), in accordance with some embodiments of the disclosure. Securing feature 502 may incorporate or be incorporated into any or all of the assemblies and features of FIGS. 1-4B, 6, and 7. Securing feature 502 may also be manufactured by the method of FIG. 8. Any or all of the features depicted in or described in reference to FIGS. 1-4B, 6, and 7 may be incorporated, in whole or in part, into securing feature 502.

Securing feature 502 comprises deformation-initiating features 504 (e.g., which may form recesses 122 of FIG. 1), weld 506, fastener release slot 508, and fastener 510. In some embodiments, each of these features may be structured to mechanically fail or deform in response to a front impact of different magnitudes (e.g., in response to threshold impact force 204 of FIG. 2 being applied to impact area 120 of FIG. 1). In some embodiments, at least one of these features is structured to mechanically fail or deform in response to a front impact of a threshold magnitude. In some embodiments, securing feature 502 may comprise at least one of these features. A front vehicle subframe may incorporate at least one or more pairs of securing feature 502 where the front vehicle subframe comprises mounts for at least one of a vehicle frame body or a vehicle body. Fastener release slot 508 comprises an open recess enclosed on two or more sides. The forward facing surface of securing feature 502 comprises fastener release slot 508 such that when a front impact is experienced by a front vehicle subframe comprised of securing feature 502, fastener 510 is released from securing feature 502 out of fastener release slot 508 as securing feature 502 translates rearward away from fastener 510. Securing feature 502 is secured to a rigid subframe rail using weld 506.

Figure 6:
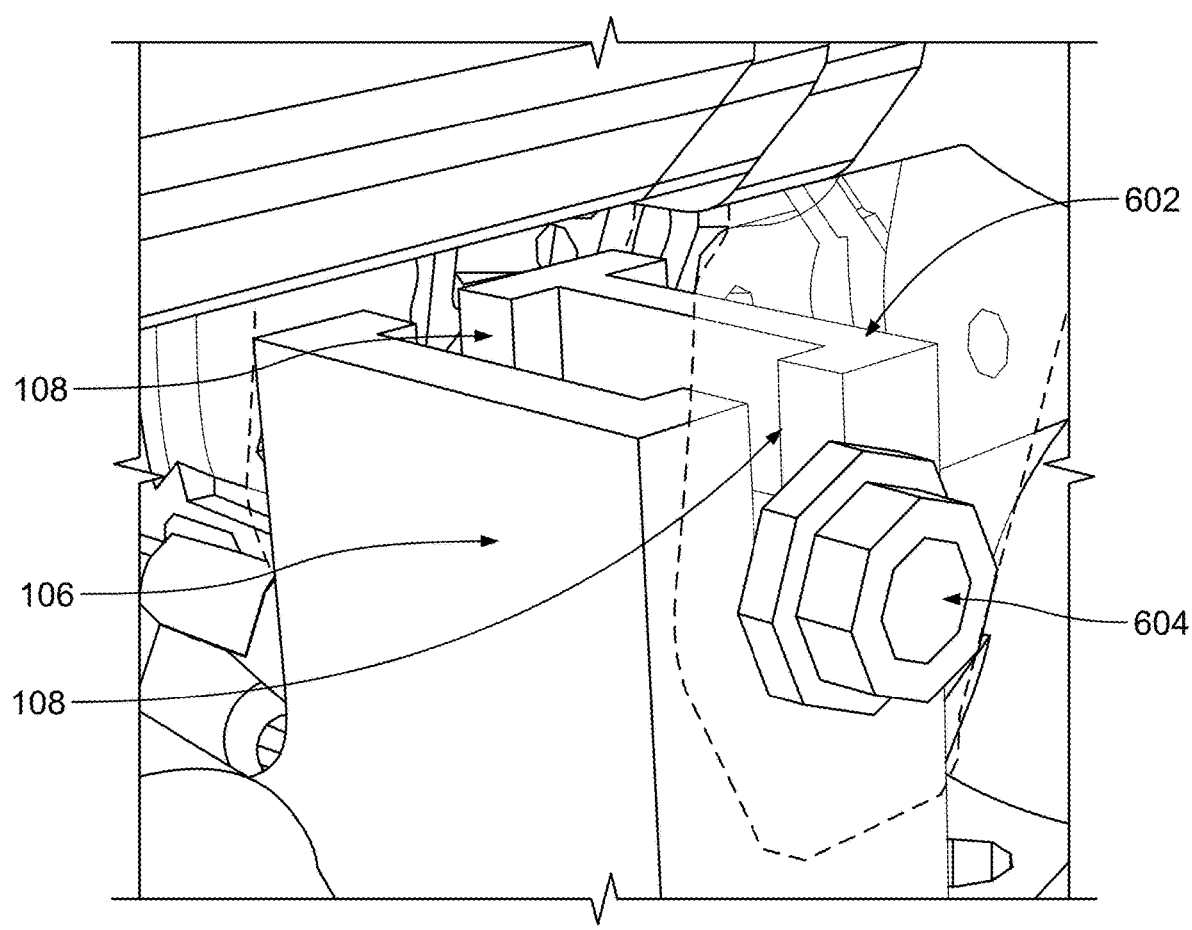
FIG. 6 depicts an exemplary slotted mount, in accordance with some embodiments of the disclosure.

FIG. 6 depicts slotted mount assembly 600 configured to interface with tabbed securing feature 602, in accordance with some embodiments of the disclosure. Slotted mount assembly 600 may incorporate or be incorporated into any or all of the assemblies and features of FIGS. 1-5 and 7. Slotted mount assembly 600 may also be manufactured by the method of FIG. 8. Any or all of the features depicted in or described in reference to FIGS. 1-5, 7 and 8 may be incorporated, in whole or in part, into slotted mount assembly 600.

Slotted mount assembly 600 comprises a top portion of subframe mount 106 of FIG. 1 comprising open-ended slot 108 positioned towards the apex of the subframe mount 106 with tabbed securing feature 602 affixed to the subframe mount 106 by fastener 604. Tabbed securing feature 602 comprises a pair of vertical tabs which extend from a frame body (e.g., frame body 704 of FIG. 7) towards subframe mount 106. Each of the vertical tabs of tabbed securing feature 602 may comprise a through hole configured to accommodate fastener 604 such that when fastener 604 is torqued to an installation criteria, fastener 604 generates a clamp load to press the vertical tabs against the surface of subframe mount 106. As shown, open-ended slot 108 may comprise a top opening where fastener 604, affixing tabbed securing feature 602, can translate vertically in the event subframe mount 106 is translated vertically downward and away from tabbed securing feature 602 (e.g., while a subframe, such as the subframes of FIGS. 1-4, is deforming in response to a front impact corresponding to threshold impact force 204 of FIG. 2). Open-ended slot 108 comprises a pair of vertical walls that are spaced at least as far apart as a diameter corresponding to fastener 604.

FIG. 7 depicts a side view of vehicle assembly 700 comprising vehicle body 702 and frame body 704 (which is affixed to front vehicle subframe 100 of FIG. 1), in accordance with some embodiments of the disclosure. Vehicle assembly 700 may incorporate or be incorporated into any or all of the assemblies and features of FIGS. 1-6. Components or features of vehicle 700 may also be manufactured by the method of FIG. 8. Any or all of the features depicted in or described in reference to FIGS. 1-6 and 8 may be incorporated, in whole or in part, into vehicle assembly 700.

Vehicle assembly 700 comprises front vehicle subframe 100 of FIG. 1, vehicle body 702, frame body 704 (comprising at least two frame rails), powertrain assembly 706, front suspension assembly 708, rear suspension assembly 710, dynamic control assembly 712, rear vehicle subframe 714, and battery assembly 716. Secured to a front portion of frame body 702 is powertrain assembly 706, front suspension assembly 708, and front vehicle subframe 100 (e.g., the subframe of FIGS. 1-4 which may incorporate any or all of the features of FIGS. 5 and 6). Secured to a rear portion of frame body 704 rear suspension assembly 710, dynamic control assembly 712, and rear subframe 714. Rear subframe 714 may comprise any or all of the features and components depicted in or described in reference to FIGS. 1-6.

Figure 8:
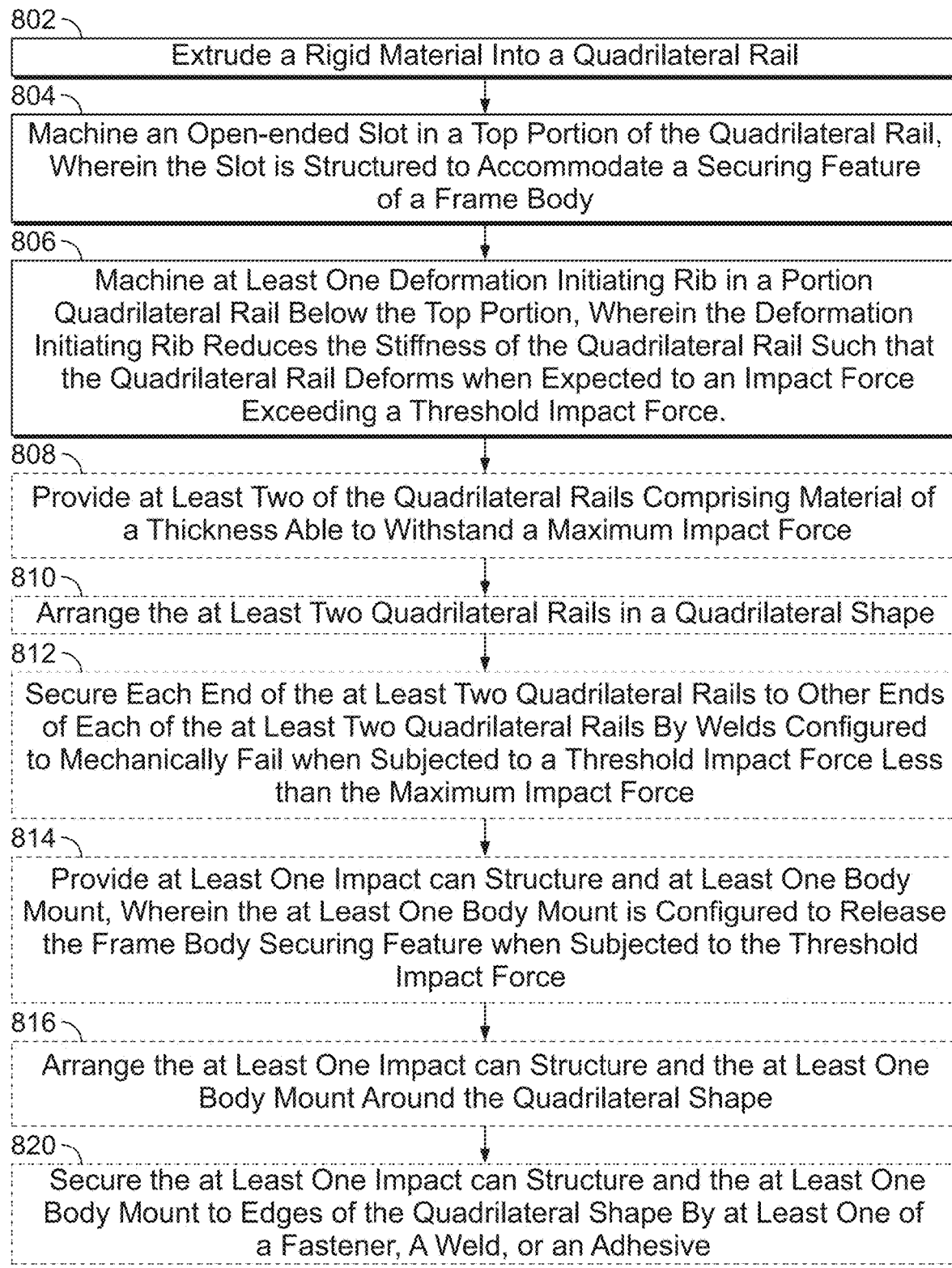
FIG. 8 depicts an exemplary method of manufacturing a vehicle frame, in accordance with some embodiments of the disclosure.

FIG. 8 depicts method 800 for manufacturing a vehicle frame, in accordance with some embodiments of the disclosure. Method 800 may be utilized, in whole or in part, to manufacture any or all of the assemblies, components, or features depicted in or described in reference to FIGS. 1-7.

At 802 a rigid material is extruded into a quadrilateral rail. At 804, an open-ended slot in a top portion of the quadrilateral rail is machined, wherein the slot is structured to accommodate a securing feature of a frame body. At 806, at least one deformation-initiating feature is machined in a portion of the quadrilateral rail below the top portion, wherein the deformation-initiating feature reduces the stiffness of the quadrilateral rail such that the quadrilateral rail deforms when exposed to an impact force exceeding a threshold impact force.

In some embodiments, at least two of the quadrilateral rails comprising material of a thickness able to withstand a maximum impact force are provided at 808. At 810, the at least two quadrilateral rails are arranged in a quadrilateral shape. At 812, each end of the at least two quadrilateral rails are secured to other ends of each of the at least two quadrilateral rails by welds configured to mechanically fail when subjected to a threshold impact force less than the maximum impact force. At 814, at least one impact can structure and at least one body mount are provided, wherein the at least one body mount is configured to release the frame body securing feature when subjected to the threshold impact force. At 816, the at least one impact can structure and the at least one body mount are arranged around the quadrilateral shape. At 818, the at least one impact can structure and the at least one body mount are secured to edges of the quadrilateral shape by at least one of a fastener, a weld, or an adhesive.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A mount for connecting a subframe to a frame rail, the mount comprising:
    a tubular top portion of a main body comprising a pair of opposing sides, wherein:
        the tubular top portion extends towards a tabbed securing feature that extends towards the main body from the frame rail, and
        the tubular top portion receives a fastener that affixes the tabbed securing feature to the tubular top portion;
    at least one U-shaped deformation-initiating feature of the main body structured to guide the mount away from the tabbed securing feature in response to an impact event; and
    an open-ended slot in each opposing side of the pair of opposing sides that forms a continuous opening from a first opposing side of the pair of opposing sides to a second opposing side of the pair of opposing sides, wherein the open-ended slot enables translation of the tabbed securing feature and the fastener independent of the mount in response to the impact event.

2. The mount of claim 1, wherein the open-ended slot is arranged such that a top opening of the open-ended slot faces a bottom portion of the frame rail.

3. The mount of claim 1, wherein:
    the at least one U-shaped deformation-initiating feature is structured to at least one of mechanically deform or mechanically fail when subjected to an impact force exceeding a threshold impact force; and
    mechanical deformation of the at least one U-shaped deformation-initiating feature guides the mount away from the tabbed securing feature and the fastener, the fastener remaining affixed to the tabbed securing feature.

4. The mount of claim 1, wherein the tabbed securing feature is configured to accommodate the fastener.

5. The mount of claim 1, wherein the mount abuts at least one rigid subframe rail.

6. A front vehicle subframe, comprising:
    a tabbed securing feature extending from a frame rail towards a main body of a frame mount;
    the frame mount comprising:
        a tubular top portion of the main body comprising a pair of opposing sides wherein the tubular top portion extends towards the tabbed securing feature,
        at least one U-shaped deformation-initiating feature structured to guide the frame mount away from the tabbed securing feature in response to an impact event, and
        an open-ended slot in each opposing side of the pair of opposing sides that forms a continuous opening from a first opposing side of the pair of opposing sides to a second opposing side of the pair of opposing sides, wherein the open-ended slot receives a fastener that affixes the tabbed securing feature to the frame mount; and
    at least one reinforcement structure, arranged rearward of the frame mount, that abuts the frame mount at a portion of the main body of the frame mount different from a portion of the frame mount comprising the open-ended slot.

7. The front vehicle subframe of claim 6, wherein the open-ended slot is configured to accommodate the fastener when the fastener interfaces with the tabbed securing feature.

8. The front vehicle subframe of claim 6, wherein the tabbed securing feature corresponds to a frame body mount for a frame body of a vehicle.

9. The front vehicle subframe of claim 6, further comprising an impact can structure, wherein a front portion of the impact can structure is positioned above a rear portion of the impact can structure, and wherein the rear portion abuts at least one rigid subframe rail.

10. The front vehicle subframe for claim 6, wherein the at least one reinforcement structure abuts the frame mount based on an arrangement of struts that flair towards sides of the front vehicle subframe.

11. The front vehicle subframe of claim 6, further comprising a second frame mount, wherein the second frame mount is configured to mechanically deform when subjected to an impact force of the impact event exceeding a threshold impact force.

12. The front vehicle subframe of claim 11, wherein the second frame mount is configured to release a securing structure corresponding to a second portion of a frame body, different from a first portion of the frame body comprising the frame rail secured at the frame mount, when mechanically deforming.

13. The front vehicle subframe of claim 6, wherein the front vehicle subframe is configured to mechanically deform down and away from at least a portion of a frame body fixedly attached to the frame mount by the tabbed securing feature when subjected to a front impact force, wherein the frame body comprises the frame rail.

14. The front vehicle subframe of claim 6, further comprising:
    three and only three pairs of frame mounts, wherein:
        a first pair of frame mounts of the three pairs of frame mounts is positioned towards a front portion of the front vehicle subframe and comprises at least one deformation initiation rib and a first securing feature of a frame body, wherein the frame body comprises the frame rail,
        a second pair of frame mounts of the three pairs of frame mounts is positioned towards a middle portion of the front vehicle subframe and comprises an open-ended slot configured to release a second securing feature of the frame body, and a third pair of frame mounts of the three pairs of frame mounts is positioned towards a rear portion of the front vehicle subframe and comprises a deformation initiation portion forward of a third securing feature of the frame body.

15. A vehicle, comprising:

a vehicle frame comprising:
- a tabbed securing feature extending from a frame rail towards a frame mount;
- a front vehicle subframe, comprising:
  - the frame mount comprising:
    - a tubular top portion of a main body comprising a pair of opposing sides, wherein the tubular top portion extends towards the tabbed securing feature,
    - at least one U-shaped deformation-initiating feature structured to guide the frame mount away from the tabbed securing feature in response to an impact event, and
    - an open-ended slot in each opposing side of the pair of opposing sides that forms a continuous opening from a first opposing side of the pair of opposing sides to a second opposing side of the pair of opposing sides, wherein the open-ended slot receives a fastener that affixes the tabbed securing feature of the frame rail to the frame mount; and
  - at least one reinforcement structure, arranged rearward of the frame mount, that abuts the frame mount at a portion of the main body of the frame mount different from a portion of the frame mount comprising the open-ended slot;
- at least one suspension mount;
- at least one body mount; and
- a powertrain assembly.

16. The vehicle of claim 15, wherein:
- the front vehicle subframe is configured to be secured to a pair of frame rails, wherein the pair of frame rails comprises the frame rail;
- the pair of frame rails comprise at least one securing feature, wherein the pair of frame rails abut at least one rigid crossmember configured to withstand a maximum impact force; and
- a rear vehicle subframe is secured to a rear portion of the pair of frame rails.

17. The vehicle of claim 15, wherein the front vehicle subframe further comprises at least one impact can structure arranged forward of the frame mount and configured to mechanically deform in response to an impact load.

18. The vehicle of claim 15, wherein the open-ended slot is configured to accommodate the tabbed securing feature.

19. The mount of claim 1, wherein:
- the first opposing side is separated by a gap from the second opposing side; and
- the continuous opening extends from a first open-ended slot in the first opposing side to the gap and to a second open ended slot in the second opposing side.

\* \* \* \* \*